Nov. 21, 1961 W. M. ISBRANDTSEN ET AL 3,009,586
SELF LOADING AND DISCHARGING VESSEL
Filed April 9, 1959 2 Sheets-Sheet 1
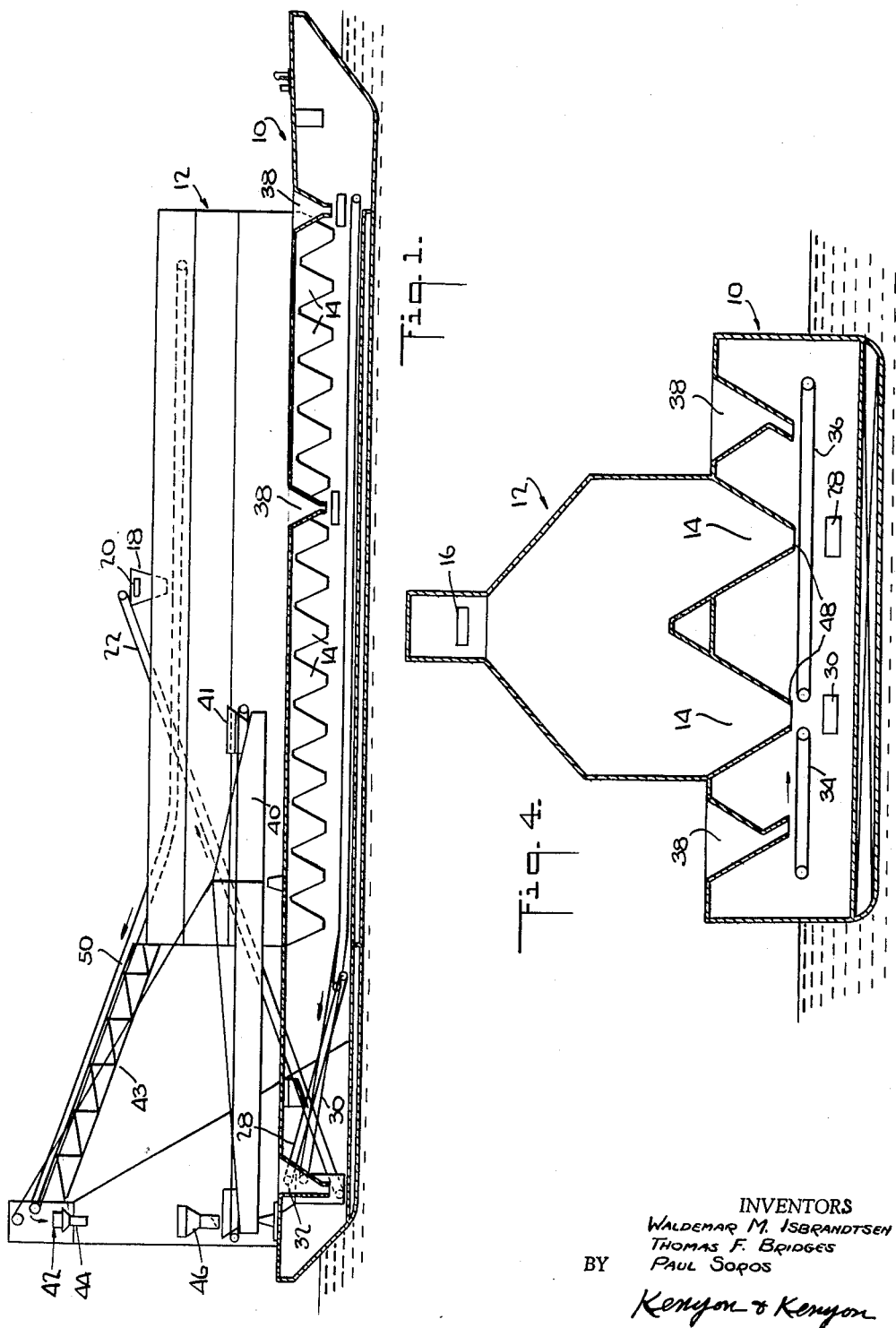
INVENTORS
WALDEMAR M. ISBRANDTSEN
THOMAS F. BRIDGES
PAUL SOROS
BY
Kenyon & Kenyon
ATTORNEYS

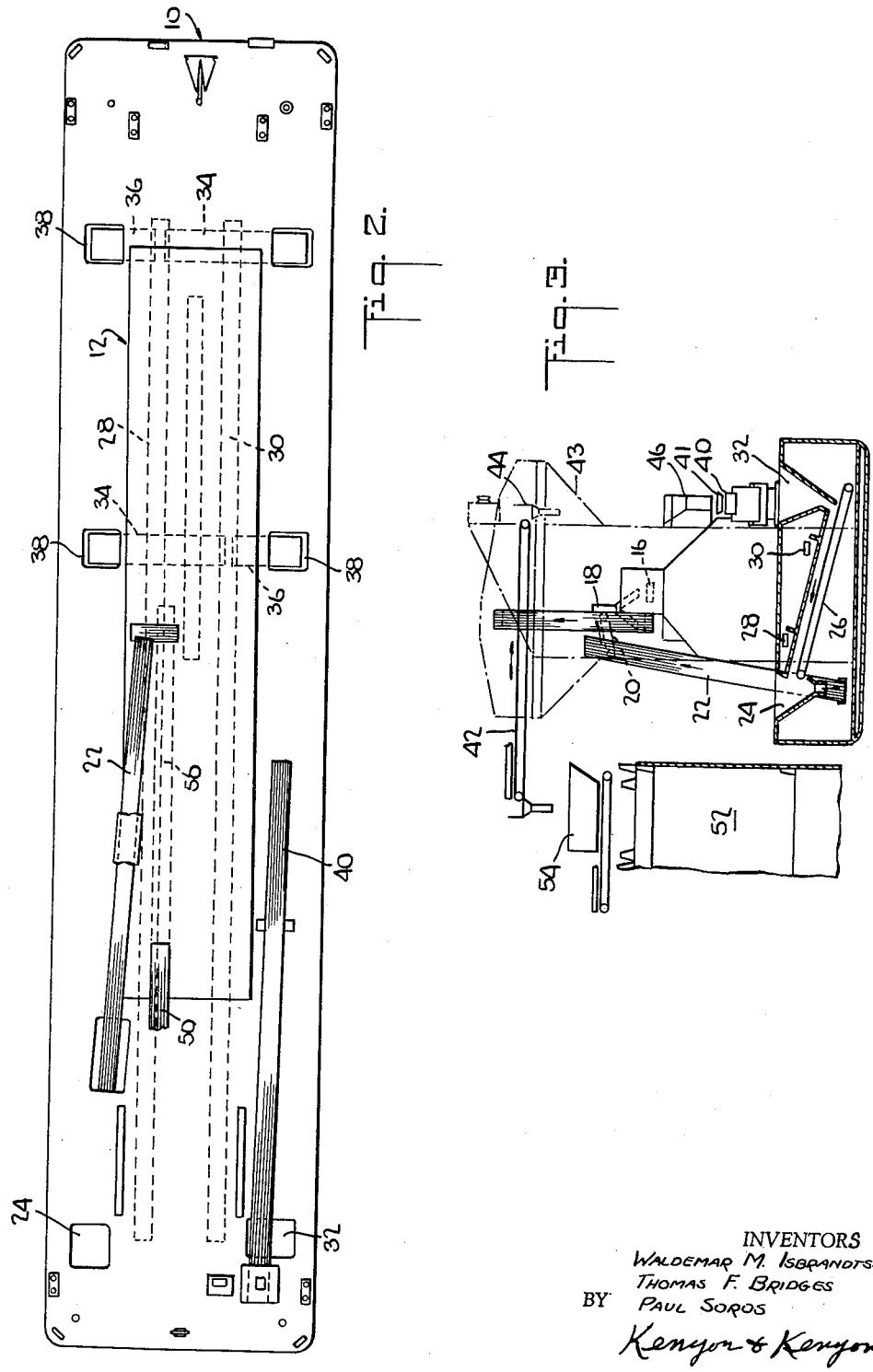

United States Patent Office 3,009,586
Patented Nov. 21, 1961

3,009,586
SELF LOADING AND DISCHARGING VESSEL
Waldemar M. Isbrandtsen, Fair Haven, N.J., Thomas F. Bridges, Great Neck, N.Y., and Paul Soros, New Canaan, Conn., assignors to Isbrandtsen Company, Inc., New York, N.Y., a corporation of New York
Filed Apr. 9, 1959, Ser. No. 805,188
18 Claims. (Cl. 214—15)

The present invention relates to self loading and discharging vessels and more particularly to a vessel having an integral means therein for loading and discharging loose bulk, granular or soft material.

In the past it has been extremely difficult to handle the loading and unloading of granular material on vessels because of the difficulties associated with the storage and handling of such materials. For example, in the handling of raw sugar, it has been necessary to place the sugar in bags or otherwise package it. Each bag then had to be handled separately, loaded on pallets or cargo nets and stored. The storage of such bags or packages wastes cargo space. The handling and transportation of raw sugar in bags or packages has resulted in substantial losses due to breaking and spoilage which arose from the amount of handling required.

At present, the efficient loading and unloading of bulk cargoes into and from ships requires deep-water port facilities. The cost of such facilities is considerable and can be prohibitive where sufficiently deep water cannot be found within a reasonably close distance to the shore. In the absence of permanent and efficient dock facilities, other methods presently in use are slow, wasteful, cumbersome and expensive.

Thus, the handling of raw sugar and materials of a similar consistency for bulk transportation has been an extremely expensive, wasteful and cumbersome procedure.

Accordingly it is an object of this invention to provide a self loading and self discharging vessel which will store granular material in bulk and have means integral thereto for the automatic loading and discharging of such granular material.

A further object is to provide a self loading and self discharging vessel making possible the efficient loading and discharging of bulk material without requiring the customary deep-water port facilities.

Another object is the provision of a self loading and discharging vessel which has a number of conveyor systems making possible the automatic loading of said material into the storage area formed as a portion of the vessel and at the same time makes possible the automatic discharging of the cargo.

A still further object is to provide a vessel which has a number of conveyor elements formed therein which operate automatically to load or discharge granular material on or from the vessel and in addition having means for facilitating the transfer of the material to be stored or unloaded from the vessel to either land or to another vessel.

A still further object is to provide a vessel with a number of conveyor elements formed therein which may be operated automatically to rearrange the cargo within the vessel, to permit changing the draft at either the forward or after end of the vessel.

The vessel may either be powered or unpowered depending upon its ultimate use. Thus in the event of the unavailability of supplemental power means such as tugs it may be necessary to provide suitable propelling and steering means. On the other hand if it is contemplated that there will be adequate tug service the vessel may be in the form of a barge. The components necessary to achieve the flexible operation, as hereinafter described, remain the same.

In the brief description which follows there will be described a barge which has incorporated therein all of the elements which make up the novel storing, loading and discharge system of this invention.

The storage space which makes up the bulk of the barge is especially adapted to make for efficient loading and discharging of granular material. In order to accomplish this result there is provided integral means within the storage space which eliminates the necessity for any type of mechanical cargo spreading means within the storage space. In addition the storage space has outlets which are advantageously placed so as to facilitate the rapid discharge of cargo of granular material.

The transportation of the granular material whether a loading operation or a discharge operation is being conducted is carried out entirely automatically and is one which provides a high degree of flexibility, thus permitting rapid loading and discharge of the granular material. To this end there is provided a conveyor network, a portion of which is used regardless of whether a loading or discharging operation is taking place. Means are provided at one point in the system for automatically controlling which of the possible operations takes place.

In addition to the conveyor system there is provided means for loading or unloading the granular material from or to either the shore or another vessel.

The flexibility of the system provides for a much improved handling and storing of the granular material and in addition it is possible to conduct either loading or discharging under all weather conditions.

Assuming that a loading operation is desired there are a number of ways which the device of this invention accomplishes that result. For instance the granular material may be loaded from a vessel at the shore at a distance therefrom by the use of a bidirectional pivoted boom conveyor by the use of a bidirectional transverse shuttle conveyor both of which are supported by a tower structure aft and which deposits the material onto the unidirectional portion of the conveyor system, which in turn carries the material to a bifunctional element which routes the flow of material to a bidirectional longitudinal shuttle conveyor whose discharge is always into the storage area.

In addition there are provided a number of loading ports positioned at the deck level which deposit onto the unidirectional portion of the conveyor system. The material is then carried by the remainder of the unidirectional portion of the conveyor system through the same sequence up to the point of the bifunctional element which, as before, deposits the material onto the longitudinal shuttle conveyor from which it is discharged into the storage facility.

In discharging the cargo the granular material is deposited from a plurality of outlets from the storage facility on a portion of the unidirectional conveyor system which as before carries the material to the bifunctional element. At this point the flow of material is routed to a longitudinal conveyor which carries the material aft to the transverse shuttle conveyor which in turn carries the material to the shore or another vessel alongside on either port or starboard of the vessel. Alternately the transverse shuttle conveyor may be arranged to discharge onto the boom conveyor which may then carry the material ashore or to another vessel aft.

The novel vessel of this invention is particularly well suited to operate as a shuttle barge to transfer efficiently bulk granular material from ship to shore or alternately from the shore to ship. Such a barge, as described below, has a shallow draft and is a stable vessel.

Other features and uses of this invention will become apparent in the detailed description which follows below when taken in connection with the drawings in which:

FIG. 1 is a schematic profile elevation of the partial section of the vessel of this invention;

FIG. 2 is a partial schematic plan view of the vessel of this invention;

FIG. 3 is a schematic sectional view taken in the way of the tower looking forward; and FIG. 4 is a schematic midship section.

Referring now to the figures, there is illustrated therein an embodiment of this invention which is in the form of a barge. In general the barge 10 is made up of the usual hull, decks and a large storage area 12, located so as to make for a stable vessel of shallow draft, thus permitting operation close to the shore.

The construction of the storage area 12, is such as to facilitate the handling of granular material. Thus there are provided a number of inverted trapezoidal shaped chambers 14. These chambers 14 aid in the complete discharging of the stored material.

There follows a description of the various means of loading and discharging the granular cargo from the storage space 12.

Under normal conditions the storage space 12 is loaded by means of a longitudinal shuttle conveyor 16. The longitudinal shuttle conveyor 16 receives the granular material from the bidirectional element hopper 18. The longitudinal shuttle conveyor 16 is mounted on tracks (not shown) which permit it to be moved in a fore and aft direction so that the load may be distributed evenly throughout the entire storage space 12. The fore and aft movement may be accomplished either automatically or manually as desired.

In addition to being mounted for movement forward and aft the longitudinal shuttle conveyor 16 is also designed to be operated in either direction.

The bidirectional hopper 18 receives the discharge from a short transverse conveyor 20 which in turn receives the discharge from the first inclined longitudinal conveyor 22 as may be seen in FIG. 3. The short transverse conveyor 20 and first inclined longitudinal conveyor 22 are unidirectional or in other words operate only to guide the flow of material into the bidirectional hopper 18. The first inclined longitudinal conveyor 22 receives granular material from either loading port 24 or an inclined transverse conveyor 26. In turn the inclined transverse conveyor 26 receives the granular material being loaded from the longitudinal reclaim conveyors 28, 30, the boom conveyor 40, or loading port 32.

Longitudinal reclaim conveyors 28, 30 are designed to take the output of transverse loading conveyors 34, 36. One set of loading conveyors 34, 36 is used with each of the two sets of starboard and port loading ports 38. Thus assuming a loading condition into the loading ports, either the port set or the starboard set, the material will be discharged onto the transverse loading conveyors 34, 36 which are unidirectional in that their operation is always inboard. The discharge of material from each of the loading conveyors 34, 36 is to one of longitudinal reclaim conveyors 28, 30 as may be seen in FIG. 2. The loading ports 38 and transverse conveyors 34, 36 are of sufficient capacity so that each can handle the maximum input per hour that can be carried by one of the longitudinal reclaim conveyors 28, 30.

Assuming a condition of loading from the shore or from a low lying vessel either alongside starboard or to the rear of the barge 10 the granular material will be carried to the barge 10 by means of a bidirectional boom conveyor 40 which is mounted on the starboard aft portion of the barge 10 as shown in FIGS. 1, 2 and 3. The boom conveyor 40 may be positioned so that it can receive material from any place in the starboard quarter or aft. When used in a loading operation the boom conveyor 40 is rotated so that the direction of the flow is to the inboard. Hopper means 41 are provided at the outer end of the boom conveyor 40 which facilitate the loading of the granular material onto the boom conveyor. The discharge of the boom conveyor is through loading port 32 and onto the inclined transverse conveyor 26. The direction of flow of material from the inclined transverse conveyor 26 follows in sequence as described above.

A bidirectional transverse shuttle conveyor 42 is provided, supported on the tower structure 43, as may be seen in FIG. 3 and which permits the loading of storage space 12 from a ship or pier alongside. The transverse shuttle conveyor 42 is mounted on rollers and supports (not shown) and may be moved laterally either automatically or by hand. The flow of material is on the transverse shuttle conveyor 42 inboard to a hopper 44 from which it is discharged into telescopic chute 46 and thence onto the inclined transverse conveyor 26 through loading port 32.

Thus the storage space 12 may be loaded through a single or a combination of different means. The loading ports 38 may be used to deposit the material onto the transverse loading conveyors 34, 36 and in turn transfer the granular material on the longitudinal reclaim conveyors 28, 30. Loading ports 24, 32 may be used to discharge the material directly to the inclined transverse conveyor 26 which also receives the discharge of longitudinal conveyors 28, 30. From the inclined transverse conveyor 26 the material is carried to the inclined longitudinal conveyor 22, from there to the short transverse conveyor 20 which discharges into the bidirectional hopper 18. When loading, the bidirectional hopper 18 automatically operates to discharge the material to the longitudinal shuttle conveyor 16 and thus into the storage space 12.

The conveyor system of this invention is to a great degree one which permits the same conveyors to operate in both the loading, discharge and self-trimming phases. Thus with the exception of a relatively small portion of the system the flow of material is identical, regardless of which operation is carried out and of whether it takes place on the aft, port or starboard side.

The various methods of discharging the granular material will now be described.

Each one of the chambers 14 in the storage space 12 has a discharge outlet 48. The outlets 48 discharge onto one or the other of the longitudinal reclaim conveyors 28, 30. The opening of the outlets 48 is automatically controlled to permit the deposit of the granular material onto longitudinal reclaim conveyors 28, 30 at a rate which does not exceed the maximum capacity of these conveyors.

The material is then carried by the longitudinal reclaim conveyors 28, 30 to the inclined transverse conveyor 26 and from there to the inclined longitudinal conveyor 22. As before, the discharge of the first longitudinal inclined conveyor 22 is to the short transverse conveyor 20 which discharges into the bidirectional hopper 18.

When discharging, however, the flow instead of being to the longitudinal shuttle conveyor 16 is diverted to a second longitudinal inclined conveyor 50 which carries the materials up and aft to the transverse shuttle conveyor 42. Depending upon its location and the direction of rotation of the transverse shuttle conveyor 42, the discharge is to either port or starboard side into a receiving unit located on shore or on the ship's deck, schematically illustrated as 52 in FIG. 3, or to a separate conveying system 54 which transports the material to the hold of the ship 52, or the discharge may be to the shore to any suitable receiving unit.

With transverse shuttle conveyor 42 moved to the port side and the direction of operation toward the starboard, the material will pass to hopper 44 from which the flow is to telescopic chute 46 onto the boom conveyor 40 which would be operated in an outboard direction in such a manner as to discharge the material to the shore or to another vessel.

It will be noted from the above that a portion of the entire conveyor system is unidirectional in that separate conveyors 20, 22, 26, 28, 30, 34, 36 act to direct the flow of material to the bidirectional hopper 18. Thus depending upon the position of the flow diverting means (a butterfly type valve or gate, not shown) within the bidirectional hopper 18 the flow will either be to the longitudinal shuttle conveyor 16 or to the second longitudinal inclined conveyor 50. Thus a single bifunctional element is used in connection with the unidirectional operation of the conveyor system to select the operating condition which is desired. A maximum degree of flexibility is thus provided which permits the use of a minimum amount of machinery, conveyor belts and the like. Also the system as a whole permits the loading of the vessel by means of one or more different means, all of which lead to a unidirectional portion of the conveyor system. The system provides for the discharge of granular material from the storage space 12 to other vessels alongside or to the shore by two separate means. The self-trimming feature permits the freeing of the vessel 10 in case of grounding, positioning the vessel 10 closer to a gently sloping space and trimming the vessel when in deep water.

The shuttle barge embodiment which has been described and illustrated above makes possible the efficient and inexpensive handling of bulk granular material. Thus the problems which have been associated with the storage, transportation and handling of granular material such as grain, fertilizer, copra, sand, ore concentrates and raw sugar are largely overcome and the entire operation is more efficient, less wasteful and considerably less expensive.

It will be appreciated that the drawings are merely schematic illustrations and are designed only to show the flow of materials depending upon which of the operating conditions is being employed. Thus, there is not shown in any of the drawings means for making the barge capable of operating in inclement weather but it will be appreciated that all of the conveyor systems positioned above deck could be housed by means of tents or structures to provide for all weather operation.

In addition it will be appreciated that the suitable controls, motors, winches and supporting structures are provided for supporting and making possible the movements necessary for the various elements as described above. Thus the two shuttle conveyors 16, 42 would be mounted on tracks permitting the fore and aft or lateral movement as described above. In addition the boom conveyor 40 is provided with the necessary lines and tackle, supported by the tower 43, which makes possible the movement and support as described.

All of the loading means and conveyor systems employed are designed to handle a maximum load, except for the loading ports 38 and longitudinal reclaim conveyors 28, 30, which are designed to operate simultaneously and thus require only half of the handling capacity required by the other components of the handling system. Thus regardless of whether the barge 10 is being loaded through either the starboard or port set of loading ports 38 or the loading port 24, or boom conveyor 40 there is sufficient capacity for the handling of the desired quantity of material per hour. In addition it is possible to load from several different sources simultaneously by adjusting the input accordingly. The discharge operation can be handled in a like manner since the output is either from the transverse shuttle conveyor 42 or the boom conveyor 40 which have full capacity for handling the maximum output.

The vessel which has been described above is illustrative of the broad aspect of this invention. It will be apparent to those skilled in the art that modifications may be employed which do not differ from the teachings of this invention, as defined by the scope of the appended claims.

What is claimed is:

1. A vessel for the storing, transporting and handling of bulk granular material having storage means formed therein and means for loading and discharging said granular material comprising: a unidirectional conveyor system, direction of flow control means, bidirectional loading conveyor means, and discharge conveyor means; said unidirectional conveyor system adapted to discharge into said direction of flow control means, said flow control means controlling the flow of granular material to said loading conveyor means for carrying said material to all portions of said storage means when a loading operation is being conducted and to said discharge conveyor means for carrying said material away from said vessel when a discharging operation is being conducted.

2. A vessel for the storing, transporting and handling of bulk granular material having storage means including a plurality of chambers formed therein adapted to spread said granular material when being loaded into said storage means and means for loading and discharging said granular material comprising: a unidirectional conveyor system, direction of flow control means, bidirectional loading conveyor means, and discharge conveyor means; said unidirectional conveyor system adapted to discharge into said flow control means, said flow control means controlling the flow of granular material to said loading conveyor means for carrying said material to all portions of said storage means when a loading operation is being conducted and to said discharge conveyor means for carrying said material away from said vessel when a discharging operation is being conducted.

3. A vessel for the storing, transporting and handling of bulk granular material having storage means including a plurality of chambers formed therein adapted to spread said granular material when being loaded into said storage means, each of said chambers having a discharge outlet and means for closing said outlets and means for loading and discharging said granular material comprising: a unidirectional conveyor system, direction of flow control means, bidirectional loading conveyor means, and discharge conveyor means; said unidirectional conveyor system having at least a portion which is positioned beneath said outlets and adapted to discharge into said direction of flow control means, said flow control means controlling the flow of granular material to said loading conveyor means for carrying said material to all portions of said storage means when a loading operation is being conducted and to said discharge conveyor means for carrying said material away from said vessel when a discharging operation is being conducted.

4. The vessel of claim 3 wherein said chambers have inverted trapezoidal shaped portions, and said outlets are positioned at the lower end of said trapezoidal shaped portions.

5. The vessel of claim 3 wherein a plurality of loading ports are positioned outboard and adjacent to said storage means and transverse loading conveyor means are provided to carry material to the portion of said unidirectional conveyor system positioned beneath said outlets.

6. The vessel of claim 3 wherein a plurality of loading ports are positioned adjacent the storage means, and wherein boom conveyor means are provided adjacent to at least one of said loading ports and adapted to discharge said material therein.

7. A vessel for the storing, transporting and handling of bulk granular material having storage means formed therein and means for loading and discharging said granular material comprising: a unidirectional conveyor system, direction of flow control means, bidirectional loading conveyor means, and discharge conveyor means; said unidirectional conveyor system adapted to discharge into said direction of flow control means, said flow control means controlling the flow of granular material to said loading conveyor means for carrying said material to said storage means when a loading operation is being conducted and to said discharge conveyor means for carrying said material away from said vessel when a discharging operation is being conducted, said loading conveyor means comprising a bidirectional shuttle conveyor and means for moving said shuttle conveyor means in a fore and aft direction whereby the discharge of said shuttle conveyor spreads said material evenly throughout said storage means.

8. A vessel for the storing, transporting and handling of bulk granular material having storage means formed therein and means for loading and discharging said granular material comprising: a unidirectional conveyor system, direction of flow control means, bidirectional loading conveyor means, and discharge conveyor means; said unidirectional conveyor system adapted to discharge into said direction of flow control means, said flow control means controlling the flow of granular material to said loading conveyor means for carrying said material to said storage means when a loading operation is being conducted and to said discharge conveyor means for carrying said material away from said vessel when a discharging operation is being conducted, a transverse shuttle conveyor, said discharge conveyor means comprising a longitudinal inclined conveyor for carrying said material to said transverse shuttle conveyor, said transverse shuttle conveyor having means for moving it in a lateral direction and being adapted to discharge said material outwardly from said vessel.

9. The vessel of claim 8 wherein a boom conveyor means is provided and wherein said shuttle conveyor is bidirectional in operation and is adapted to discharge away from said vessel when operated in an outboard direction and to said boom conveyor means when operated in an inboard direction.

10. The vessel of claim 9 wherein said boom conveyor means is bidirectional in operation and is adapted to discharge away from said vessel when operating in an outboard direction and to a portion of said unidirectional conveyor system when operating in an inboard direction.

11. A vessel for the storing, transporting and handling of bulk granular material having storage means including a plurality of chambers formed therein adapted to spread said granular material when being loaded into said storage means, each of said chambers having a discharge outlet and means for closing said outlets and means for loading and discharging said granular material comprising: a unidirectional conveyor system, direction of flow control means, bidirectional loading conveyor means, and discharge conveyor means; said unidirectional conveyor system having at least a portion which is positioned beneath said outlets and another portion of which is adapted to discharge into said direction of flow control means, said flow control means controlling the flow of granular material to said loading conveyor means for carrying said material to said storage means when a loading operation is being conducted and to said discharge conveyor means for carrying said material away from said vessel when a discharging operation is being conducted, said loading conveyor means comprising a bidirectional shuttle conveyor, and means for moving said shuttle conveyor means in a fore and aft direction whereby the discharge of said shuttle conveyor spreads said material evenly throughout said chambers, a transverse shuttle conveyor, said discharge conveyor means comprising a longitudinal inclined conveyor for carrying said material to said transverse shuttle conveyor, said transverse shuttle conveyor having means for moving it in a lateral direction and being adapted to discharge said material outwardly from said vessel.

12. The vessel of claim 11 wherein there is provided boom conveyor means and wherein said shuttle conveyor is bidirectional in operation and is adapted to discharge away from said vessel when operated in an outboard direction and to said boom conveyor means when operated in an inboard direction.

13. The vessel of claim 12 wherein said boom conveyor means is bidirectional in operation and is adapted to discharge away from said vessel when operating in an outboard direction and to a portion of said unidirectional conveyor system when operating in an inboard direction.

14. A vessel for the storing, transporting and handling of bulk granular material having storage means including a plurality of inverted trapezoidal shaped chambers, an outlet for each of said chambers positioned at the lower end thereof, and means for closing said outlets and means for loading and discharging said granular material comprising: a unidirectional conveyor system, direction of flow control means, bidirectional loading conveyor means, and discharge conveyor means; a plurality of loading ports positioned outboard and adjacent to said storage means and transverse loading conveyor means for carrying said material to said unidirectional conveyor system, at least a portion of which system is positioned beneath said outlets and another portion of which is adapted to discharge into flow control means, said flow control means controlling the flow of granular material to said bidirectional loading conveyor means for carrying said material to said storage means when a loading operation is being conducted and to said discharge conveyor means for carrying said material away from said vessel when a discharging operation is being conducted, said bidirectional loading conveyor means comprising a bidirectional shuttle conveyor and means for moving said shuttle conveyor means in a fore and aft direction whereby the discharge of said shuttle conveyor spreads said material evenly throughout said storage means.

15. A vessel for the storing, transporting and handling of bulk granular material having storage means including a plurality of inverted trapezoidal shaped chambers, an outlet for each of said chambers positioned at the lower end thereof, and means for closing said outlets and means for loading and discharging said granular material comprising: a unidirectional conveyor system, direction of flow control means, bidirectional loading conveyor means and discharge conveyor means; a plurality of loading ports positioned outboard and adjacent to said storage means and transverse loading conveyor means for carrying said material to the said unidirectional conveyor system, at least a portion of which system is positioned beneath said outlets and which system is adapted to discharge into said direction of flow control means, said flow control means controlling the flow of granular material to said bidirectional loading conveyor means for carrying said material to said storage means when a loading operation is being conducted and to said discharge conveyor means for carrying said material away from said vessel when a discharging operation is being conducted, a transverse shuttle conveyor, said discharge conveyor means comprising a longitudinal inclined conveyor for carrying said material to said transverse shuttle conveyor, said transverse shuttle conveyor having means for moving it in a lateral direction and being adapted to discharge said material outwardly from said vessel.

16. A vessel for the storing, transporting and handling of bulk granular material having storage means including a plurality of inverted trapezoidal shaped chambers, an outlet for each of said chambers positioned at the lower end thereof, and means for closing said outlets and means for loading and discharging said granular material comprising: a unidirectional conveyor system, direction of flow control means, bidirectional loading conveyor means, and discharge conveyor means; a plurality of loading ports positioned outboard and adjacent to said storage means and transverse loading conveyor means for carrying said material to said unidirectional conveyor system, at least a portion of which system is positioned beneath said outlets and another portion of which is adapted to discharge into said direction of flow control means, said flow control means controlling the flow of granular material to said bidirectional loading conveyor means for carrying said material to said storage means when a loading operation is being conducted and to said discharge conveyor means for carrying said material away from said vessel when a discharging operation is being conducted, said bidirectional loading conveyor means comprising a bidirectional shuttle conveyor and means for moving said shuttle conveyor means in a fore and aft direction whereby the discharge of said shuttle conveyor spreads said material evenly throughout said storage means, a transverse shuttle conveyor, said discharge conveyor means comprising a longitudinal inclined conveyor for carrying said material to said transverse shuttle conveyor, said transverse shuttle conveyor having means for moving it in a lateral direction and being adapted to discharge said material outwardly from said vessel.

17. The vessel of claim 16 including boom conveyor means, and wherein said transverse shuttle conveyor is bidirectional in operation and is adapted to discharge away from said vessel when operated in an outboard direction and to said boom conveyor means when operated in an inboard direction.

18. The vessel of claim 17 wherein said boom conveyor means is bidirectional in operation and is adapted to discharge away from said vessel when operating in an outboard direction and to a portion of said unidirectional conveyor system when operating in an inboard direction.

References Cited in the file of this patent

UNITED STATES PATENTS 1,603,498     Wallace _____ Oct. 19, 1928